April 30, 1963 H. E. WARD 3,088,083
TRANSDUCER
Filed Dec. 2, 1960
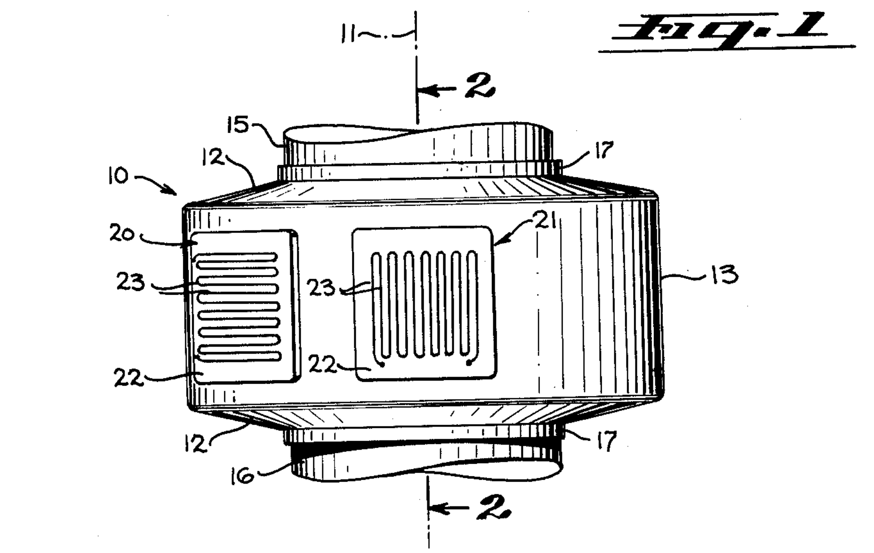
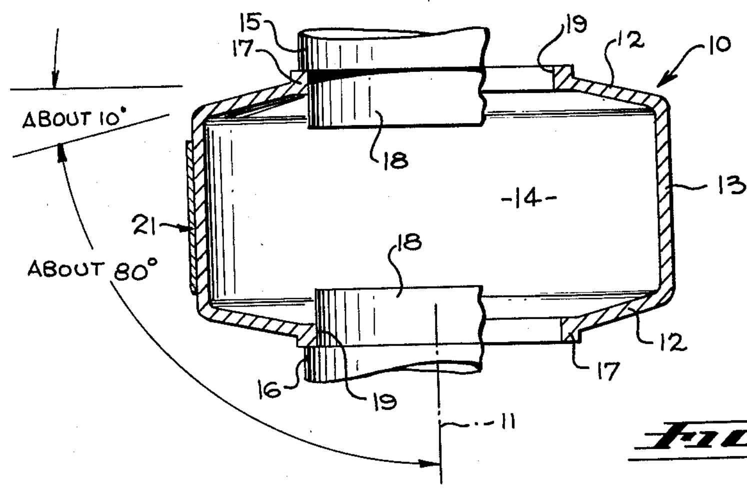
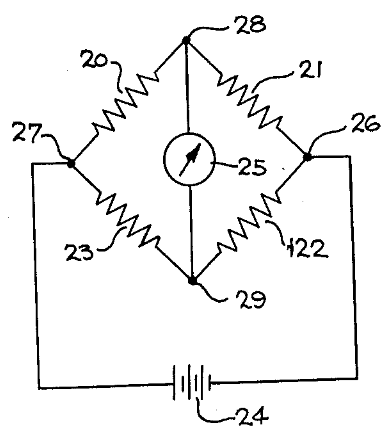
Fig. 3
HOWARD E. WARD
INVENTOR.
BY Whittemore & Hulbert [signature]
ATTORNEYS United States Patent Office 3,088,083
Patented Apr. 30, 1963

3,088,083
TRANSDUCER

Howard E. Ward, Anaheim, Calif., assignor to The Task Corporation, Anaheim, Calif., a corporation of California Filed Dec. 2, 1960, Ser. No. 73,286
4 Claims. (Cl. 338—5)

This invention relates generally to strain measurements, and more particularly has to do with a novel transducer or load cell to which strain gauges are to be bonded, the transducer being characterized as producing a high degree of measurable strain at the gauge locations in reference to applied loading.

It is known that when a body is subjected to longitudinal deformation there is an accompanying lateral deformation of the body which is generally considerably less than the longitudinal deformation. For example, longitudinal stretching of a body is accompanied by lateral shrinkage of the body, and the lateral strain effect is referred to as the Poisson effect. It is also known that these strain effects may be detected and measured through the application of bonded strain gauges of resistance wire type to the body being deformed. However, the amount of strain produced in response to application of a given load varies with the geometry of the body subjected to loading, and it becomes increasingly difficult to measure smaller and smaller loads due to the decreasing strains produced thereby.

A major purpose of the present invention is to provide a novel body, certain surfaces of which are highly susceptible to strain production in response to given applied loading, different area portions of such surface or surfaces, to which strain gauges are applicable for measuring Poisson effect, being subject to the same strain or deformation. Broadly speaking, it has been discovered that each of a class of highly desirable strain producing transducers or load cells may be characterized as having in common a construction that comprises a shell having a central axis, axially oppositely spaced end portions through which endwise applied loading is transmissible, at least one of which tapers sharply inwardly toward the axis and a body portion extending about a zone between the shell end portions. The body portion is subject to strain in response to transmission of loading therethrough between the end portions, and the body portion is adapted to carry a strain gauge or strain gauges to detect body strain, the latter being affected by the taper of one or more of the shell end portions.

As will be brought out, the body portion surface is made most susceptible to strain deformation that is uniform over extended surface area to which gauges are applicable, by forming a thin shell to have a central axis and opposite end portions that are generally frusto-conical about the central axis and that taper sharply inwardly toward the axis and away from one another, and to have a body portion that is tubular and which transmits loading between the end portions. As a result, strain gauges bonded to the shell tubular body are subjected to much more strain than if the shell end portions are perpendicular to the axis, or are not sharply tapering toward that axis. More specifically, the strain deformation is discovered to be at or near maximum when the interior angularity in an axial radial plane and between the central axis and each of the frusto-conical end portions is about 80°.

These and other objects and advantages, together with the details of and illustrative embodiments, will be more fully understood from the following detailed description of the drawings, of which:

FIG. 1 is an exterior elevation looking toward the side of the transducer;

FIG. 2 is a section taken on line 2—2 of FIG. 1; and,

FIG. 3 is a circuit diagram.

In FIGS. 1 and 2 the novel load cell is shown to comprise a thin shell 10 having a central axis 11, axially oppositely spaced end portions 12 through which axially loading is transmissible, and a body portion 13 extending about the interior zone 14 between the end portions 12. Endwise applied loading is applicable to the end portions 12 as by the members 15 and 16 which are suitably attached to end sections 17 of the shell, these sections being annular and being located closer to the axis 11 than the end portions 12. As shown in FIG. 2, the members 15 typically include projections 18 extending through circular openings 19 formed by the sections 17.

The body portion 13 is subject to strain or deformation in response to transmission of loading therethrough between the end portions 12, and furthermore the body portion is adapted to carry strain gauges attached thereto for detecting body strain. As illustrated, the body portion is generally tubular about the axis 11 so that considerable surface area thereof is presented outwardly, as seen in FIG. 1, for supporting strain gauges such as are illustrated at 20 and 21. Each of these gauges may typically but not necessarily comprise a membrane or flat sheet 22 having bonded thereto a fine wire 23, the latter having stretches or legs which are directionally elongated throughout the major extent of the wire. Gauge 21 has its wire legs oriented generally parallel to the axis 11 so as to be subject to longitudinal strain, whereas gauge 20 has its wire stretches extending generally through short arcs about the axis 11. The latter condition exists because the membrane 22 of gauge 20 is adhesively bonded to the tubular outer surface of the body portion 13. Accordingly, the gauge 20 will measure Poisson strain effect or circumferential shortening of the body portion 13 in response to the application of tension loading to the transducer shell as by members 15 and 16.

The strain produced uniformly over the surface of the body portion 13 and communicated to the gauges as a result of their bonding to the body portion, is at or near maximum when the shell end portions 12 are made frusto-conical, to taper sharply toward the axis 11 and away from one another. More specifically, it has been discovered that the strain deformation communicated to the gauges 20 and 21, or any gauges bonded to the body portion 13, is maximized when the interior angle in an axially radial plane and between the central axis 11 and each of the frusto-conical end portions 12 is substantially and sufficiently in excess of 45°, as for example about 80°. This angularity is shown in FIG. 2 and it is also clear from that figure that about 10° angularity exists between each of the frusto-conical end portions and a plane perpendicular to the axis 11.

FIG. 3 shows gauges 20 and 21 interconnected in a Wheatstone bridge circuit that includes other resistances 122 and 23. The circuit also includes a battery 24 and a current sensing instrument 25, these elements being respectively connected between points 26 and 27 and points 28 and 29. In operation, the bridge is balanced before load application, and thereafter the applied loading is detected as a function of the current registered by the instrument 25. If desired, the bridge resistances 122 and 23 may respectively comprise strain gauges applied to the body portion 13 with orientations corresponding to gauges 20 and 21, the purpose being to eliminate temperature variations of the shell which would otherwise be reflected in unbalance of the bridge leading to false readings of the instrument 25. Thus gauges 21 and 23 would be oriented as is gauge 21 in FIG. 1, and gauges 20 and 122 would be oriented as in gauge 20 in FIG. 1. Other combinations of gauge orientations referred to in body portion 13 are possible even though not specifically described herein.

I claim:

1. Improved load cell apparatus, comprising a shell having a central axis, axially oppositely spaced end portions through which endwise applied loading is transmissible, and a tubular body portion extending about a zone between said end portions, said body portion being subject to strain in response to transmission of loading therethrough between said end portions, said body portion carrying strain gauge means to detect body strain, at least one of said end portions being frusto-conical and tapering sharply inwardly toward said axis and away from the opposite end portion, said strain gauge means being attached to said body portion and including a first bonded wire strain gauge having wire lengths extending in short arcs about said axis and a second bonded wire strain gauge having wire lengths extending generally parallel to said axis.

2. Improved load cell apparatus comprising a relatively thin shell having a central axis, axially oppositely spaced end portions through which axial loading is transmissible and a body portion extending about a zone between said end portions, said body portion being subject to strain in response to transmission of loading therethrough between said end portions and said body portion having strain gauge means attached thereto for detecting body strain, said body portion being generally tubular about said axis and said end portions being generally frusto-conical about said axis, said end portions tapering sharply inwardly toward said axis and away from one another, the taper defining an interior angle of about 80° in an axial plane and between said axis and each of said frusto-conical end portions.

3. The invention as defined in claim 2 in which said strain gauge means includes at least two resistance type strain gauges, one gauge having elongated resistance members extending generally parallel to said axis and the other gauge having elongated resistance members extending generally through short arcs about said axis.

4. The invention as defined in claim 2 including axially spaced load transmitting members carried by said end portions in coaxial relation.

References Cited in the file of this patent

UNITED STATES PATENTS

| | | |
|---|---|---|
| 2,582,886 | Ruge | Jan. 15, 1952 |
| 2,636,964 | Lancor et al. | Apr. 28, 1953 |
| 2,933,707 | Blystone et al. | Apr. 19, 1960 |
| 3,036,283 | Singdale et al. | May 22, 1962 |